US007793005B1

(12) United States Patent (10) Patent No.: US 7,793,005 B1
Fernald et al. (45) Date of Patent: Sep. 7, 2010

(54) POWER MANAGEMENT SYSTEM USING A MULTI-MASTER MULTI-SLAVE BUS AND MULTI-FUNCTION POINT-OF-LOAD REGULATORS

(75) Inventors: Kenneth W. Fernald, Austin, TX (US); James W. Templeton, Austin, TX (US); John A. Wishneusky, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 45 days.

(21) Appl. No.: 11/425,489

(22) Filed: Jun. 21, 2006

Related U.S. Application Data

(63) Continuation-in-part of application No. 11/198,698, filed on Aug. 5, 2005, now Pat. No. 7,653,757, and a continuation-in-part of application No. 10/820,976, filed on Apr. 8, 2004, now Pat. No. 7,506,179.

(60) Provisional application No. 60/599,369, filed on Aug. 6, 2004, provisional application No. 60/462,414, filed on Apr. 11, 2003.

(51) Int. Cl.
 *G06F 3/00* (2006.01)
 *G05F 1/40* (2006.01)
(52) U.S. Cl. ............................ 710/3; 323/282; 323/222; 713/340
(58) Field of Classification Search ...................... 710/3, 710/120, 305; 323/282, 222; 713/340
 See application file for complete search history.

(56) References Cited

U.S. PATENT DOCUMENTS 5,117,430 A  5/1992  Berglund
5,646,509 A  7/1997  Berglund et al.

(Continued)

FOREIGN PATENT DOCUMENTS

WO  WO 02/31943 A2  4/2002

OTHER PUBLICATIONS

V. C. H. Nicholas, C. T. Lau, and B. S. Lee; "A Power LAN for Telecommunication Power Supply Equipment"; IEEE Conference on Computer, Communication, Control and Power Engineering (TENCON, Region 10); Oct. 1993; pp. 24-27; vol. 3; Beijing.

Jerry G. Williford and James T. Dubose; "30 kVA LF/VLF Power Amplifier Module"; IEEE Military Communications Conference (MILCOM '95); Nov. 1995; pp. 748-751, vol. 2.

(Continued)

*Primary Examiner*—Alford W. Kindred
*Assistant Examiner*—Ernest Unelus
(74) *Attorney, Agent, or Firm*—Meyertons Hood Kivlin Kowert & Goetzel, P.C.; Jeffrey C. Hood

(57) ABSTRACT

A power management system may comprise two or more POL regulators configured to transmit and receive data over a shared bus according to either a proprietary or a common bus protocol. Each POL regulator may be identified by a unique address that is part of an address group, and may be configured via pin strapping to be able to perform a variety of power management functions. Any one of the POL regulators within the address group may become a bus master and transmit information to the shared bus by addressing itself. The other POL regulators in the address group may monitor the shared bus for events, and may respond to the transmitted information according to their address, their configuration, and the transmitted information. The response may include the POL regulators performing one or more power management functions, including adjusting their respective output voltages. The POL regulators may respond to each event according to the requirements corresponding to the event, thereby performing the necessary tasks to enable power management functions without the need for interconnecting analog signal lines and without being explicitly controlled.

18 Claims, 7 Drawing Sheets

U.S. PATENT DOCUMENTS

| | | | |
|---|---|---|---|
| 5,675,480 A | 10/1997 | Stanford | |
| 5,935,252 A | 8/1999 | Berglund et al. | |
| 6,079,026 A | 6/2000 | Berglund et al. | |
| 6,199,130 B1* | 3/2001 | Berglund et al. | 710/302 |
| 6,262,900 B1 | 7/2001 | Suntio | |
| 6,396,167 B1 | 5/2002 | Simburger et al. | |
| 6,396,169 B1* | 5/2002 | Voegeli et al. | 307/52 |
| 6,563,294 B2* | 5/2003 | Duffy et al. | 323/283 |
| 6,709,277 B2* | 3/2004 | Ruttan et al. | 439/66 |
| 6,754,720 B1* | 6/2004 | Packer | 710/3 |
| 6,788,035 B2* | 9/2004 | Bassett et al. | 323/272 |
| 6,894,468 B1* | 5/2005 | Bretz et al. | 323/274 |
| 6,915,440 B2 | 7/2005 | Berglund et al. | |
| 6,936,999 B2 | 8/2005 | Chapuis | |
| 6,944,686 B2* | 9/2005 | Naruse et al. | 710/39 |
| 6,949,916 B2* | 9/2005 | Chapuis | 323/282 |
| 6,965,502 B2* | 11/2005 | Duffy et al. | 361/18 |
| 7,000,125 B2* | 2/2006 | Chapuis et al. | 713/300 |
| 7,049,798 B2* | 5/2006 | Chapuis et al. | 323/282 |
| 7,080,265 B2* | 7/2006 | Thaker et al. | 713/300 |
| 7,082,485 B2* | 7/2006 | Ellerbrock et al. | 710/110 |
| 7,082,488 B2* | 7/2006 | Larson et al. | 710/301 |
| 7,174,402 B2* | 2/2007 | Ellerbrock et al. | 710/112 |
| 7,206,944 B2* | 4/2007 | Odaohhara et al. | 713/300 |
| 2001/0007118 A1* | 7/2001 | Matsuda | 710/129 |
| 2001/0052762 A1* | 12/2001 | Tsuji | 323/282 |
| 2003/0070020 A1* | 4/2003 | Kondo et al. | 710/120 |
| 2003/0191862 A1* | 10/2003 | Greenblat | 709/251 |
| 2004/0093533 A1 | 5/2004 | Chapuis et al. | |
| 2004/0123164 A1* | 6/2004 | Chapuis et al. | 713/300 |
| 2004/0123167 A1* | 6/2004 | Chapuis | 713/300 |
| 2004/0135560 A1* | 7/2004 | Kernahan et al. | 323/282 |
| 2004/0201279 A1* | 10/2004 | Templeton | 307/11 |
| 2004/0255070 A1* | 12/2004 | Larson et al. | 710/305 |
| 2006/0015616 A1* | 1/2006 | Chapuis et al. | 709/225 |
| 2006/0172787 A1* | 8/2006 | Ellis et al. | 463/1 |

OTHER PUBLICATIONS

R. Sebastian, M. Castro, E. Sancristobal, F. Yeves, J. Peire, and J. Quesada; "Approaching hybrid wind-diesel systems and Controller Area Network"; IEEE 28th Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; http://www.cd4power.com/data/apnotes/acan-02.pdf; 92 pages.

James P. Earle; "IPMI/IMPB Satellite Controller Test Procedure" (Application Guide); C&D Technologies, Inc.; www.cdpowerelectronics.net/products/appnotes/acan04.pdf; 12 pages.

"How to Design Battery Charger Applications that Require External Microcontrollers and Related System-Level Issues"; Dallas Semiconductor; www.maxim-ic.com/appnotes.cfm/appnote_number/680; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; http://focus.ti.com/lit/an/slva069/slva069.pdf; May 1999; 12 pages.

"HDX-600P Hot Swap—600 Watts—1U High"; Switching Power, Inc.; www.switchpwr.com/hdx-600p.pdf; 2 pages.

"HDSX-600P: I2C Serial Bus Interface (for IPMI implementation):"; Switching Power, Inc.; www.switchpwr.com/I2C.pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; Twentieth International Telecommunications Energy Conference (INTELEC); 1998; pp. 345-348.

"SPI—Appnotes: Alarm & Monitoring Signals"; Switching Power Inc.; 2 pages; www.switchpwr.com/alarm_signals.pdf.

"TDA8020HL Dual Smart Card Interface—Objective Specification v4.2—Data Sheet"; Feb. 24, 2001; 22 pages; Philips Semiconductors.

Chrisotphe Chausset; "Application Note—TDA8020HL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; www.ednmag.com.

H. Taylor and L.W. Hruska; "Standard Smart Batteries for Consumer Applications" Proceedings of the Tenth Annual Battery Conference on Applications and Advances; Jan. 1995; p. 183; Long Beach, CA, U.S.A.

"3-V to 6-V Input, 6-A Output Tracking Synchronous Buck PWM Switcher with Integrated FETs (SWIFT™) for Sequencing"; Oct. 2002-Apr. 2005; 21 pages; Texas Instruments Incorporated; http://focus.ti.com/lit/ds/symlink/tps54680.pdf.

"Programmable Four-Channel Step-Down DC/DC Converter"; Texas Instruments Incorporated; 2005; 16 pages; http://focus.ti.com/lit/ds/symlink/tps54900.pdf.

"LNBH21—LNB Supply and Control IC with Step-up Converter and I2C Interface" (Datasheet); Apr. 2004; 20 pages; STMicroelectronics; www.st.com/stonline/products/literature/ds/9890.pdf.

"Smart Battery System Specifications—System Management Bus Specification"; Dec. 11, 1998; 39 pages; SBS Implementers Forum.

"Advanced Configuration and Power Interface Specification"; Feb. 2, 1999; 397 pages; Intel Microsoft Toshiba.

"The I2C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997-Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. RS-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); Summit Microelectronics, Inc.; www.summitmicro.com/prod_select/summary/sms66/SMS66DS.pdf; 2003; 26 pages.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

Office Action of Sep. 20, 2006, in U.S. Appl. No. 10/820,976, 19 pages.

Office Action of Feb. 21, 2007, in U.S. Appl. No. 10/820,976, 12 pages.

Final Office Action of Aug. 14, 2007, in U.S. Appl. No. 10/820,976, 12 pages.

Advisory Action of Oct. 26, 2007, in U.S. Appl. No. 10/820,976, 3 pages.

Examiner's Answer of Mar. 18, 2008, in U.S. Appl. No. 10/820,976, 18 pages.

Office Action of Jun. 17, 2008, in U.S. Appl. No. 10/820,976, 13 pages.

Office Action of Mar. 6, 2008, in U.S. Appl. No. 11/356,674, 39 pages.
Office Action of Jun. 16, 2008, in U.S. Appl. No. 11/405,293, 20 pages.
Office Action of Nov. 8, 2006, in U.S. Appl. No. 11/198,698, 41 pages.
Final Office Action of May 3, 2007, in U.S. Appl. No. 11/198,698, 36 pages.
Interview Summary of May 31, 2007, in U.S. Appl. No. 11/198,698, 4 pages.
Office Action of Jul. 25, 2007, in U.S. Appl. No. 11/198,698, 32 pages.
Interview Summary of Oct. 31, 2007, in U.S. Appl. No. 11/198,698, 3 pages.
Final Office Action of Dec. 27, 2007, in U.S. Appl. No. 11/198,698, 30 pages.
Advisory Action of Feb. 19, 2008, in U.S. Appl. No. 11/198,698, 3 pages.
Interview Summary of Jul. 14, 2008, in U.S. Appl. No. 11/198,698, 2 pages.
Office Action of Nov. 13, 2006, in U.S. Appl. No. 11/405,294, 35 pages.
Final Office Action of May 8, 2007, in U.S. Appl. No. 11/405,294, 37 pages.
Office Action of Jul. 25, 2007, in U.S. Appl. No. 11/405,294, 35 pages.
Final Office Action of Dec. 27, 2007, in U.S. Appl. No. 11/405,294, 32 pages.
Advisory Action of Feb. 19, 2008, in U.S. Appl. No. 11/405,294, 3 pages.
A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.
T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.
"Installation Guide—Agilent Technologies MPS Mainframe Model 66000A"; Apr. 2000; 29 pages; Agilent Technologies; Malaysia.
"Chemistry-Independent Battery Chargers"; Maxim Integrated Products; http://pdfserv.maxim-ic.com/en/ds/MAX1647-MAX1648.pdf; 25 pages.; Sunnyvale, CA, U.S.A.
Ron Vinsant, John Difiore and Richard Clarke; "Digitally-controlled SMPS extends power system capabilities"; Powerconversion & Intelligent Motion; 1994; pp. 30-37; vol. 20, No. 6.

* cited by examiner

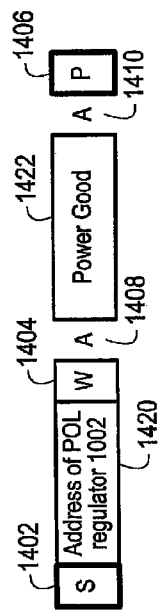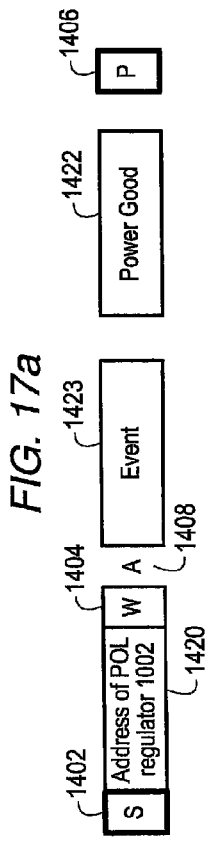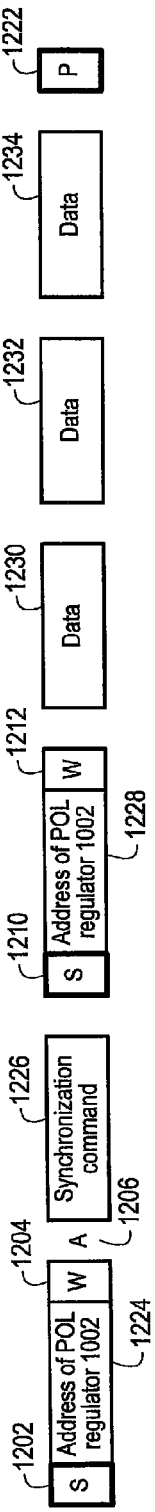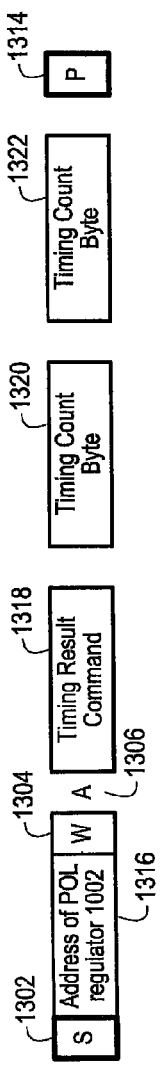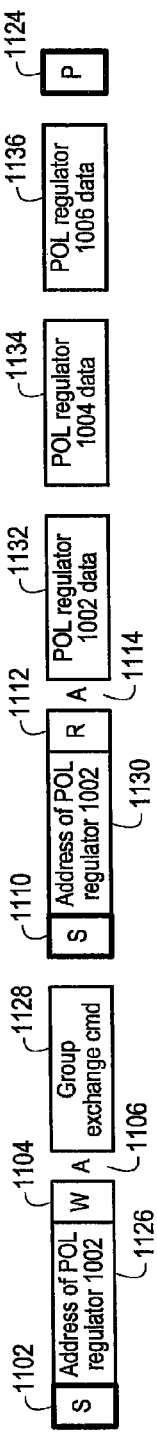

POWER MANAGEMENT SYSTEM USING A MULTI-MASTER MULTI-SLAVE BUS AND MULTI-FUNCTION POINT-OF-LOAD REGULATORS

CONTINUATION-IN-PART

This application is a continuation-in-part of U.S. patent application Ser. No. 11/198,698 filed Aug. 5, 2005 now U.S. Pat. No. 7,653,757 and titled "Method for Using a Multi-Master Multi-Slave Bus for Power Management", whose inventors are Kenneth W, Fernald, James W. Templeton, and John A. Wishneusky, and which claims benefit of priority of U.S. provisional application Ser. No. 60/599,369 filed Aug. 6, 2004 and titled "Method For Using A Multi-Master Multi-Slave Bus For Power Management".

This application is additionally a continuation-in-part of U.S. patent application Ser. No. 10/820,976 filed Apr. 8, 2004 now U.S. Pat. No. 7,506,179 and titled "Method And Apparatus For Improved DC Power Delivery, Management And Configuration", whose inventor is James W. Templeton, and which claims benefit of priority of U.S. provisional application Ser. No. 60/462,414 filed Apr. 11, 2003 and titled "Method And Apparatus For Improved DC Power Delivery, Management And Configuration".

U.S. patent application Ser. No. 11/198,698, U.S. provisional application Ser. No. 60/599,369, U.S. patent application Ser. No. 10/820,976, and U.S. provisional application Ser. No. 60/462,414 are all hereby incorporated by reference as though fully and completely set forth herein.

BACKGROUND OF THE INVENTION

1. Field of the Invention

This invention relates generally to power systems. More specifically, the present invention provides an improved method and apparatus for DC power delivery, management and configuration 2. Description of the Related Art Power supply design has become a much more critical and difficult task than it was a few years ago. High-current/low-voltage ICs typically require a very clean and stable source of DC power. The power source must be capable of delivering very fast current transients. The electronic path to these loads must also have low resistance and inductance (for example, a 1.5V supply would be completely dropped across a 25 mΩ resistance at 60 Amps). Power distribution in complex systems is often accomplished by distributing a high-voltage, low-current power source to a set of local direct-current to direct-current (DC-DC) converters. These converters, typically known as point-of-load (POL) devices and/or POL regulators (also referred to as POLs or POL converters), convert the higher voltage to a level more appropriate for the load or multiple loads that require power. Generally, each POL may be configured to generate a different voltage potential or multiple POLs may be configured to generate the same voltage potential. POLs generating the same voltage potential may be designed to drive separate loads. Similarly, two or more POLs may be connected in parallel to drive one or more common loads.

In systems that utilize multiple POL regulators, it is common for the POL regulators to exchange information in order to implement necessary power management features. Typical power management features include voltage tracking, load balancing, sequencing, phase spreading, clock synchronization, as well as many other functions not enumerated here. With the rising complexity and robustness requirements of many systems, the ability to monitor and control the power distribution sub-system has become increasingly more critical. Traditionally, information exchanged by POL regulators has been represented by analog voltage and/or current signals. There are, however, several advantages to representing the exchanged information as digital data that may be transferred across a bus interconnecting all related POL devices. Monitoring of power distribution sub-systems has typically been implemented via a standard digital interface coupling the major components of the power distribution system to a host microprocessor (or more generally, a Local Controller). The digital interface may allow the Local Controller to continuously monitor the health of the power system. It may also control the power system in order to implement system-level features such as standby and sleep modes.

One example of a digital interface that is well suited for such applications is the I2C (Inter-IC) bus. The I2C bus is a multi-master, multi-slave, two-wire bus that offers support for any device on the bus to access any other device. Transactions on the I2C bus typically consist of a start event, a destination slave address, a read/write bit, and a variable number of data bytes. The transactions are generally terminated by a stop event or another start event. The data byte immediately following the destination slave address may be interpreted as a command or tag byte, which identifies the nature and/or type of the packet. FIG. 1 shows the basic packet structure of a packet 100 that may be representative of communication packets used with a multi-master multi-slave bus, such as the I2C bus. Packet 100, which may contain data to be transferred or written to a slave device, may include a start bit "S" 20 signaling the beginning of the communication from the master. This may be followed by a unique slave address byte "ADR" 22, with the most significant bit (MSB) coming first. The subsequent Read/Write bit 24, typically the eighth bit overall, following "S" 20, specifies whether the slave is to receive (typically a '0' value) or to transmit (typically a '1' value). Read/Write bit 24 may be followed by an acknowledge bit "A" 26 issued by the receiving device, acknowledging receipt of the previous byte.

The transmitting device (slave or master, as indicated by the Read/Write bit) may then transmit a data byte 34 starting with the MSB. In the example packet of FIG. 1, the slave device is to receive and the first byte following slave address byte 22 is a command byte "CMD" 34 sent by the master device. At the end of the byte, the receiving device may issue a new "A" 28. This 9-bit pattern may be repeated until all the required bytes have been transmitted, in this case Data1 36 and Data2 38, and a respective acknowledge bit following each byte. In a write transaction, as illustrated in FIG. 1, when the master device is done transmitting, it may monitor the last acknowledge bit, that is, "A" 32, then issue a stop condition "P" 40. In a read transaction (slave device transmitting), the master device may not acknowledge final byte 38, thereby indicating to the slave device that the slave device's transmission is completed. The master device may then issue "P" 40.

FIG. 2 shows a typical configuration in which multiple POL regulators 102, 104, and 106 are coupled together via I²C bus 120 comprising data signal (SDA) line 124 and clock signal (SCL) line 122, which also couples a Local Controller 108 and other devices 110, 112, and 114 that are not POL regulators. Each of attached devices 102, 104, 106, 110, 112, and 114 must be responsive to a unique address, which is its respective slave address. The slave address may be defined for a device or programmed into a device in several possible ways. For example, the address may be "hard wired" into the device by design. Alternatively, the address may be determined by the connections of one or more pins on a device, with the one or more pins dedicated to selecting the address to which the device will respond. In yet another configuration, the device may contain non-volatile memory into which the slave address as well as other configuration information may be programmed during manufacturing or during a configuration operation performed to prepare the device for use in a particular system or application.

During operation, Local Controller 108 would typically address each POL regulator and/or other device, by using that POL regulator's or device's unique slave address as required, writing control information and reading status and data. FIG. 3 is a simplified illustration of a packet being transferred from Local Controller 108 to POL regulator 104. Each of the devices on shared I²C bus 120 will receive the packet sent by Local Controller 108. However, only POL regulator 104 would recognize the address at the start of the packet as its own. POL regulator 104 would thus respond to the packet initiated by Local Controller 108, receiving or supplying data as required.

FIG. 4 shows the basic bus waveforms on the shared SDA (410 and 412), and SCL (414) bus wires. The bus connections of each device connected to the bus are typically of an "open-drain" nature, with an external pull-up device, generally a resistor or current source (not shown), on each shared signal wire. Each device connected to the bus has the ability to drive the signals to a low or logic 0 level or to not drive it at all. If no device is "pulling" the bus low, the external pull-up typically causes the bus signal to remain at a high or logic 1 level. Also illustrated in FIG. 4 are, a transmission start event 402 corresponding for example to "S" bit 20 in FIG. 1, the MSB through LSB of a slave address byte corresponding to "ADR" 22, an acknowledge event 404 corresponding to "A" bit 26, followed by a data byte corresponding to Data2 38, and a stop event 406 corresponding for example to "P" bit 40.

Another bus standard, developed after the I²C bus standard, is the SMBus (System Management Bus), which is backward compatible with the I²C bus standard while introducing additional features to support error detection, hazard recovery, and dynamic address assignment among others. It should be noted that both the I²C bus and the SMBus have predefined means for identifying a slave or destination device, but neither has predefined means for identifying the master or source of a bus transaction, a feature that is oftentimes required for POL regulators to communicate with each other. The information transfer requirements of several common power management features implemented among POL regulators will now be presented below.

It is a common requirement that the POL regulators in a system enable and disable their power outputs in a predefined order, or sequence. This has commonly been referred to as "sequencing", and is necessary to avoid both temporary and permanent interference with the operation of the system. The sequencing is traditionally accomplished by connecting a "POWER GOOD" (PG) output pin of each POL regulator to an "ENABLE" (EN) input pin of the next POL regulator to be enabled. This is illustrated in FIG. 5, where the PG pin of POL regulator 202 is coupled to the EN pin of POL regulator 204, while the PG pin of POL regulator 204 is coupled to the EN pin of POL regulator 206. Each POL regulator may assert its PG pin when the output of the POL regulator has met some predefined condition or reached some predefined state. This event may then allow the next POL regulator to enable its output followed by asserting its own PG pin.

As an alternative to sequencing, some systems may require that multiple POL regulators enable their outputs simultaneously, while the outputs of the POL regulators maintain a predefined relationship with one another. This has commonly been referred to as "voltage tracking". For example, a given POL regulator may be required to never allow its output to exceed that of another designated POL regulator as the POL regulators ramp their respective output voltages. FIG. 6 shows a diagram featuring the respective output voltage 612 of a first POL regulator, considered the master device, and the respective output voltage 614 of a second POL regulator, considered the slave device, as a function of time. As illustrated, the master device and slave device voltage outputs, 612 and 614, respectively, are enabled simultaneously, with only a nominal delay 616 due to the communication delay that exists between the two devices. As also illustrated, the master device output 612 and the slave device output 614 maintain different values in a predefined manner. Traditionally, the analog output of the master POL regulator has been connected to an analog input of the slave POL regulator in order to implement the tracking feature.

In digital implementations of power conversion devices, the output voltage generated during turn-on and turn-off may be controlled by a precision digital-to-analog converter, which may be driven by a digital ramp generator. If the oscillator used to drive the ramp generator is precise, and the POL regulators are enabled simultaneously, their outputs may ramp together in a predictable fashion. This may provide a means for voltage tracking without the need for additional bus traffic, and is often referred to as "open-loop" voltage tracking (as described in the above paragraph). However, mismatch between the oscillators configured within different POL regulators may result in the turn-on and turn-off ramps of the different POL regulators changing at different rates, thereby introducing a mismatch between the respective output voltages of the POL regulators.

It is often more practical to provide a large amount of supply current to a load by connecting two or more POL regulators in parallel, with each POL regulator intended to provide a roughly equal share of the total load current. Due to possible systematic and/or random mismatches between POL regulators, the respective currents provided by different interconnected POL regulators may vary considerably. Various methods, such as current balancing and load sharing have typically been used to correct such current mismatches. Typically, current balancing is accomplished by allowing the POL regulators to exchange information about their respective load currents. For example, if a master POL regulator in the group passes its measured load current to the other POL regulators in the group, the other POL regulators may adjust their own respective currents such that they match the value of the current they have received from the master POL regulator. In addition, by virtue of the outputs of the slave POL regulators being connected in parallel, the master POL regulator's output must decrease as the slave POL regulators increase their respective output currents, in order to maintain a constant total load current. Other methods may allow for all POL regulators to pass their respective measured load currents to other members of the group. In all, the communication between POL regulators for maintaining current balance has traditionally been accomplished via one or more shared analog signals.

Additionally, in order to reduce both the input and output voltage ripple, groups of switching regulators, specifically POL regulators in this case, are often required to spread their switching times across the switch period such that the respective times at which the POL regulators are charging their respective output capacitors (from the input bus) have minimum overlap with one another. This is generally referred to as "phase spreading". Phase spreading has typically been accomplished by configuring each POL regulator to switch at a set, predefined position within the switching period.

Other corresponding issues related to the prior art will become apparent to one skilled in the art after comparing such prior art with the present invention as described herein.

SUMMARY OF THE INVENTION

In one set of embodiments, a power management system may be configured to allow digital information corresponding to power management functions to be passed between POL regulators using a standard multi-master multi-slave interface such as $I^2C$ bus interface or SMBus interface. POL regulators may be configured using program pins via pin strapping, and coupled to a serial data bus where they may monitor bus transactions initiated by other similar POL regulators. According to its configurations, each POL regulator may respond to the bus transactions initiated by other POL regulators, and may perform a variety of power management functions in addition to regulating its own output voltage. The transactions may not explicitly command another POL regulator to take any specific action. Rather, each POL regulator may make decisions autonomously, based upon knowledge of its own state and the status information being transmitted by other POL regulators onto the shared bus. When coupled to a standard multi-master multi-slave interface such as an $I^2C$ bus interface or SMBus interface, the POL regulators may report information to multiple other POL regulators while maintaining compatibility with non-POL regulators also connected to the bus. Power management systems thereby designed to use a common bus to transmit digital information corresponding to power management functions may be configured without the traditional analog connections typically required in systems where multiple power management features need to be implemented, as well as without requiring a local controller to co-ordinate the behavior of the POL regulators.

In one embodiment, as an alternative to the dedicated analog signal connections traditionally used for communication between POL regulators, each POL regulator is configured to generate an event on the shared bus, (such as the $I^2C$ bus or a serial data bus), in which the POL regulator generating the event both identifies itself to the other POL regulators coupled to the bus, and transmits a command corresponding to one of many possible power management functions. The POL regulators on the same bus may be equally configured to monitor the bus for events, and respond to the event according to the requirements inherent within the command. Each POL regulator may be configured via pin strapping according to the functionality desired from the POL regulator. Pursuant to its configuration, once the POL regulator is coupled to the bus, it may operate without requiring further control from a local controller or from any of the other POL regulators. Each POL regulator may be configured according to a system plan or system considerations corresponding to the overall power management system, the POL regulators thereby forming a POL regulator network capable of performing the necessary tasks to enable power management functions.

In one embodiment, information is distributed to multiple destinations, such as multiple POL regulators coupled to the shared bus, by an originating device, which may be one of the POL regulators acting as a bus master effectively transmitting the information to itself. The action of performing a bus write in which a given POL regulator may send the packet to its own address may both identify the source of the data, and may allow any slave device (e.g. POL regulators configured to respond to the address of the POL regulator acting as a bus master) to identify and receive the data from the bus during the transaction. Therefore, in addition to having its own respective assigned bus address, each POL regulator may be assigned or configured with one or more additional addresses, which may define one or more POL regulator groups enabling specialized group data exchange that may be required by various power management features. The additional address, addresses, or address groups may be used to receive data placed on the bus by a POL regulator acting as bus master, and to recognize the identity of that bus master POL regulator. Such configuration or configurations are compatible with normal features of shared buses such as the $I^2C$ and System Management Bust (SMBus).

For example, in one set of embodiments, voltage tracking may be accomplished by one of the POL regulators becoming a bus master and transmitting data corresponding to its target, or measured, output on the shared common digital bus. The other POL regulators may receive the data while observing the transmission initiated by the POL regulator acting as bus master, and may use it to control their own output(s). The POL regulator acting as bus master may both identify itself on the bus and transmit a digital value corresponding to its output voltage. Therefore, one or more POL regulators (configured to track the output voltage of a POL regulator acting as bus master) may recognize the POL regulator currently acting as bus master, monitor that POL regulator's transmitted output voltage, and control their own output(s) accordingly.

Current balancing functionality may be implemented by digitizing the load current information for each device and transmitting the resulting digital information across a shared digital bus. In one set of embodiments, the POL regulators may also be configured to dynamically adjust their switching times based on information exchanged on the common digital bus. Other power management functions, such as phase spreading, fault recovery, clock synchronization, over-temperature shutdown, and most remaining power management functions may also be accomplished in a similar manner.

BRIEF DESCRIPTION OF THE DRAWINGS

The foregoing, as well as other objects, features, and advantages of this invention may be more completely understood by reference to the following detailed description when read together with the accompanying drawings in which:

FIGS. 17a and 17b show two different embodiments of a packet structure for a POL regulator issuing its own respective "power good" event;

FIG. 18 shows one embodiment of a packet structure for a POL regulator issuing a clock synchronization command;

FIG. 19 shows one embodiment of a packet structure for a POL regulator reporting its clock synchronization count; and FIG. 20 shows one embodiment of a packet structure for multiple POL devices supplying data in response to a group exchange command.

Figure 1:
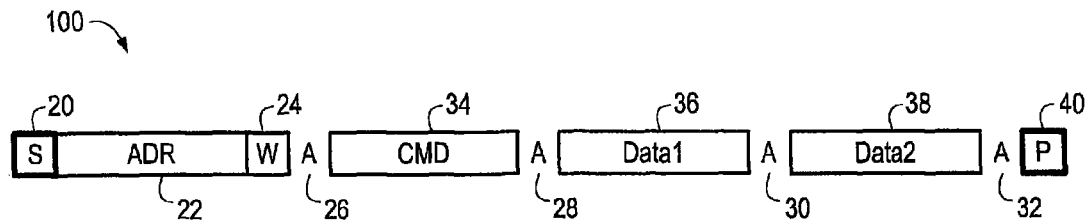
FIG. 1 shows the basic packet structure of an $I^2C$ packet according to prior art.
Figure 2:
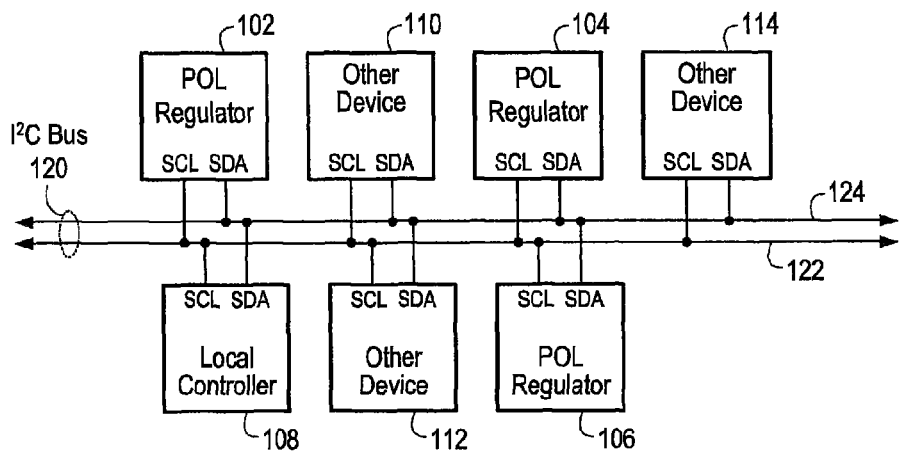
FIG. 2 shows a typical system configuration with POL and non-POL regulators and a local controller coupled to an $I^2C$ bus, according to prior art.
Figure 3:
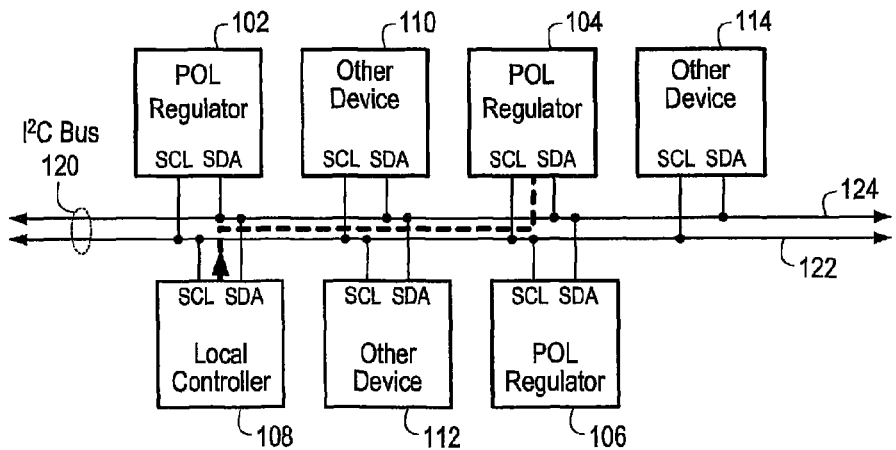
FIG. 3 illustrates a simplified transfer of a packet from a Local Controller to a POL regulator, according to prior art.
Figure 4:
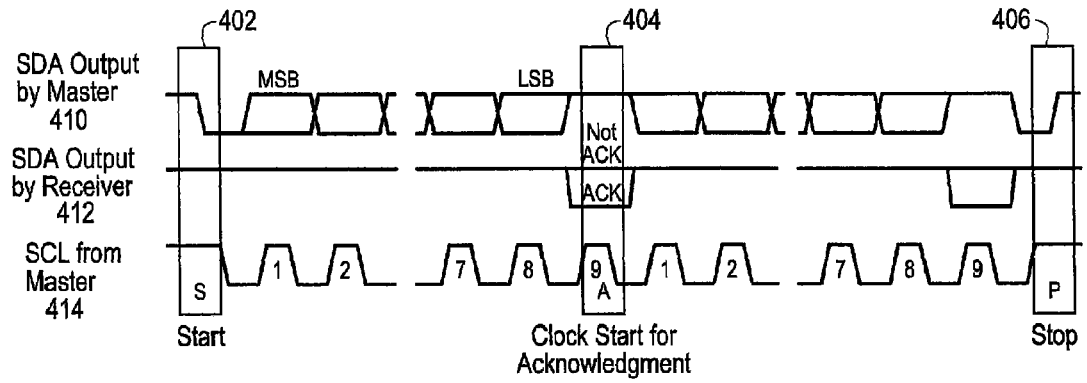
FIG. 4 shows the basic bus waveforms on the shared SDA and SCL bus wires of an $I^2C$ bus, according to prior art.
Figure 5:
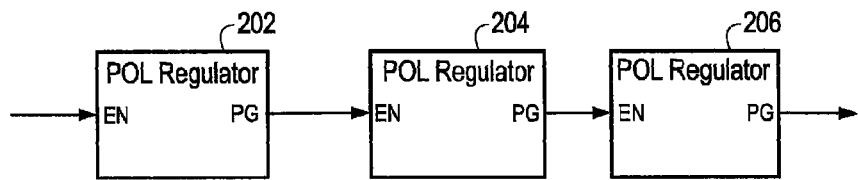
FIG. 5 shows one possible way of linking of POL regulators, according to prior art.
Figure 6:
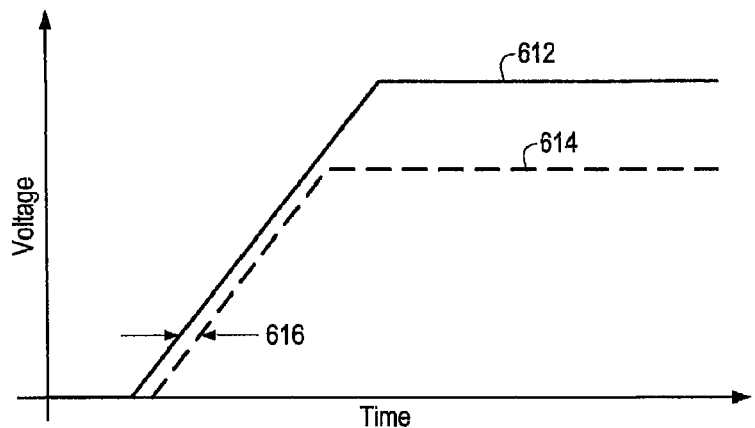
FIG. 6 shows a diagram featuring the respective output voltages of a first POL regulator, considered the master device, and a second POL regulator, considered the slave device, as a function of time, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, a device coupled to a bus that is "uniquely identified by an address" refers to a device identified by an address or addresses that are not shared with any other device that is also coupled to the bus. That is, the address that identifies a specified device does not identify any other device. However, more than one address may uniquely identify a single device. For example, a device may be uniquely identified by address '34ef45' and also by address '34ef44', but neither '34ef45' nor '34ef44' may identify any other device. Furthermore, "targeting an address" during a bus operation refers to initiating the bus operation addressing a device uniquely identified by the address. For example, if a first device coupled to the bus has a specified first address that uniquely identifies the first device, and a second device initiates a write operation "targeting the specified first address", then the address information transmitted by the first device as part of initiating the write operation is the specified first address. Furthermore, the terms "bus operation" and "bus transaction" are used interchangeably.

As also used herein, identifying a given POL regulator as a master POL regulator does not imply control of other POL regulators by the given (master) POL regulator. Instead, it is indicative of the given POL regulator's current designation as a bus master by virtue of its originating a transmission. Similarly, the term "slave POL regulator" may simply refer to POL regulators that are currently monitoring the bus for transactions and are not currently transmitting information, but are not in effect controlled by a transmitting master POL regulator. In other words, a master POL regulator may be acting as the bus master to initiate/make a transmission, and remain a peer to other POL regulators while making information available to a group of designated POL regulators. The master POL regulator may not actually behave as a master with respect to the other (slave) POL regulators insofar as it may not actively control the other (slave) POL regulators. In actuality, those skilled in the art may note that in the terminology of certain buses, for example the SMBus, a transmitting device—such as the given POL regulator designated as a master POL regulator above—may simply be regarded as a slave device addressed by its own transmission.

In one set of embodiments, a power management system may be configured with POL regulators coupled together over a bus, and digital information corresponding to power management functions passed between the POL regulators employing a standard multi-master multi-slave interface, for example an I²C bus interface or SMBus interface. Each POL regulator may be statically configured during manufacturing or via pin strapping, and coupled to a bus (e.g. a serial data bus), where it may monitor bus transactions initiated by other similar POL regulators. In some embodiments the POL regulators may also be dynamically configured over the bus. Each POL regulator may respond to the bus transactions initiated by other POL regulators, and may perform a variety of power management functions, including regulating its own output voltage, according to its configuration and the given bus transaction. When coupled to a standard multi-master multi-slave interface (such as an I²C bus interface or SMBus interface), the POL regulators may report information to multiple other POL regulators while maintaining compatibility with non-POL regulators also connected to the bus. Power management systems thereby designed to use a common bus to transmit digital information corresponding to power management functions may be configured without the traditional analog connections typically required in systems where multiple power management features need to be implemented, as well as without requiring a local controller to co-ordinate and/or control the behavior of the POL regulators.

In one set of embodiments, a method for using a multi-master multi-slave bus for power management is implemented as a broadcast technique used in conjunction with a pre-existing bus protocol, to co-ordinate the behavior of a plurality of point-of-load (POL) regulators configured in a power management system, and coupled to the bus that operates according to the pre-existing bus protocol. The exchanged information may have a single origination point (for example a master POL regulator during voltage tracking) and multiple destination points (for example slave POL regulators during voltage tracking). The information may be exchanged digitally, providing improved noise immunity and reduced system complexity by minimizing the number of signals connected between devices. In one embodiment, in order to maintain a minimum number of interconnected signal lines, the signal exchange may be performed on an existing digital interface within the system.

Figure 10:
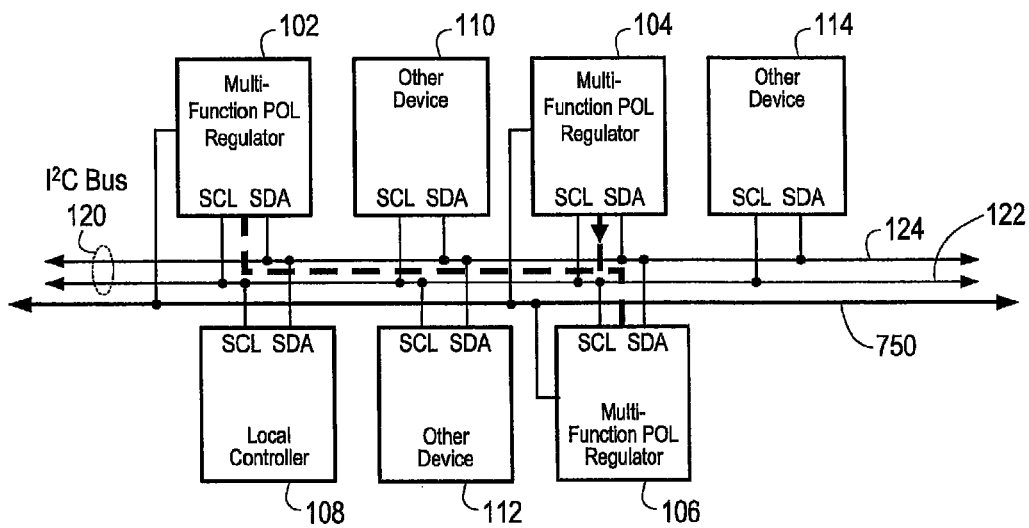
FIG. 10 shows one embodiment of a system configured with POL regulators, non-POL devices and a local controller coupled to an I²C bus, where a transmitting POL regulator is designated as a master POL regulator during information transfer between POL regulators.

Accordingly, in a system comprising POL regulators, power management functions such as supply sequencing and phase control, for example, may be implemented in the context of multiple nodes as opposed to a single node, with each node monitoring other nodes in the system. In one set of embodiments, a POL regulator may be configured to communicate with other POL regulators at the system level so that features such as supply sequencing, load sharing and phase control may be enabled. Bi-directional digital communication between a POL regulator and another POL regulators and/or between a POL regulator and an optional master control IC may be accomplished in several ways. Functions that involve the interaction of two or more POL regulators may be enabled and/or controlled by an "ad-hoc" network that is formed when the individual devices are coupled together, (as shown in FIG. 10, for example). In another embodiment, a dedicated local controller may also be connected to the POL regulators to coordinate certain higher-level functions (as also shown in FIG. 10). It should be noted, again, that while certain embodiments may be configured with a dedicated local controller or control IC, such controllers are not required as each POL regulator may be designed and configured to be capable of performing all the power management functions required by the given system in which the POL regulator is configured. In addition, while FIG. 10 illustrates POL regulators and other devices coupled together via an I$^2$C bus, in other embodiments the POL regulators may be coupled together via a different bus, which may be any proprietary bus adapted to couple the POL regulators, or any number of standard buses also adapted to do the same (for example a single-bit serial bus).

Figure 7:
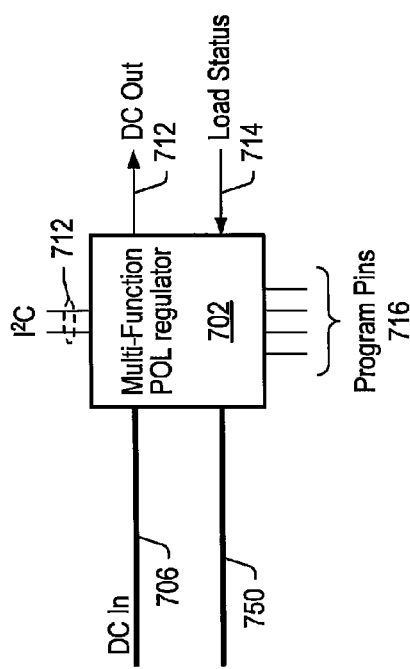
FIG. 7 illustrates the interface terminals of a multi-function POL regulator configured according to one embodiment.

A multi-function POL regulator may function independently of any bus to which it is coupled. That is, the POL regulator may accept instructions from the bus and may place status data onto the bus, while also being configured to perform functions autonomously from the bus. Thus, the system may remain operational even in case of a bus failure. However, the individual nodes on the bus may use the bus to transmit real-time feedback data to other nodes or controllers on the bus, simplifying complex control problems. Each POL regulator may deliver information to and receive information from the load via an interface adapted for multiple functionality, as illustrated in FIG. 7. As shown in FIG. 7, one possible way in which POL regulator 702 may be configured is through program pins 716. Various functions and/or parts of power management functions may be programmed into POL regulator 702 via pin-strapping, using program pins 716. For example, an address identifying POL regulator 702 may be programmed by tying select ones of program pins 716 either to a high voltage, to a low voltage, and/or to a pull-up/pull-down resistor, and/or by leaving select pins floating, that is, unconnected. Other functions and/or parts of power management functions may be configured and/or programmed into the POL regulator in a similar manner.

The POL regulator's output current and/or voltage may also be remotely programmable to affect DC output 712. In addition, the POL regulator may also measure the current, voltage and temperature of the load received through load status line 714 in real-time, and take independent action to effect a change such as lowering voltage, limiting current, turning off a device, etc. Information input to the POL regulator may comprise digital signals, analog signals (that the POL regulator may be configured to digitize), or a combination of the two. The information may then be made available to other components via bus line 750 coupling the POL regulator 702 to other POL regulators or devices (see also FIG. 10). For example, other multi-function POL regulators may monitor the bus for information transmitted onto the bus by POL regulator 702, and respond according to their configuration based on their own program pins similar to program pins 716, and/or configuration information that may have been programmed into the POL regulators via bus line 750. It should be noted that in alternate embodiments, the configuration information may also be programmed into the POL regulators during manufacturing. POL regulator 702 may also be incorporated into previous systems due to its ability to interface with I$^2$C bus 712. In addition, the functionality of the bus corresponding to bus line 750 may also be adapted within the I$^2$C bus protocol, and each POL regulator may be configured accordingly. In one set of embodiments, I$^2$C bus 712 may be used to configure POL regulator 702 in lieu of using program pins 716, as mentioned above.

As previously mentioned, POL regulator 702 may be configured statically, (e.g. through program pins 716 via pin strapping), or dynamically during operation via bus line 750 or via the I$^2$C bus, using multi-master/multi-slave techniques that enable the POL regulators to communicate with each other. Some of these techniques will be further described below. For example, parameters such as output voltage and current levels may be set via the bus (through bus line 750) or by pin-strap selection (e.g. through program pins 716). Similarly, the POL regulators may be programmed to limit how much current they deliver to a load, or to accept inputs and make them available to the bus. This may enable the load status comprising for example current, temperature or RPM readings to be digitized by the POL regulator and made available to the bus via bus line 750.

For example, one or more POL regulators performing a pulse-width-modulation (PWM) function (for DC-to-DC conversion, motor drives etc.) may be synchronized to a common clock or to a multiple (and sub-multiple) of a common clock via bus line 750 coupling the POL regulators together. For example, in one set of embodiments, a group of POL regulators coupled to bus 750 may be configured such that once the system is powered up, the clock signal of one of the POL regulators in the group automatically becomes the master clock, and all other POL regulators of the group may synchronize their clocks to the master clock. The synchronization may occur in response to a sync pulse that may be delivered over bus 750 by the POL regulator whose clock is the master clock, by each POL regulator receiving this sync pulse. In alternate embodiments the POL regulators may be synchronized to a common clock by a local controller, in which case the clock data and/or sync pulse may be transmitted onto bus 750 by the local controller (see again, FIG. 10). Additionally, the local controller and/or POL regulators may be configured with the ability to synchronize their switching clocks to a special multiple (e.g. a prime number multiple) of a reference clock in order to reduce the probability of the switching clock mixing with or interfering with another system clock.

In order to reduce cost and complexity, a simple communication means between the POL regulators may be required. As shown in FIG. 7, one embodiment of a POL regulator may be configurable to communicate over bus 750 (which may be any standard communication bus adapted to couple the POL regulators, and/or a proprietary bus design, e.g. a single bit bidirectional serial data bus), using a proprietary communication protocol if necessary. In addition, the POL regulators may be configurable to also communicate with each other over I$^2$C bus 712. Thus, a power management system may comprise a number of multi-function POL regulators coupled together via one (or more) communication buses as mentioned above. In one set of embodiments, the POL regulators may be coupled together via I²C bus for system level monitoring and control. Typically, the I²C bus and other similar busses do not inherently support transactions that require addressing multiple devices coupled to the bus at once without addressing all the devices coupled to the bus, and/or transactions for which the originating device needs to be identified. Transactions for multiple destinations in general may be performed on an I²C bus via a general broadcast transaction, but a general broadcast transaction used for performing power management functions may not be compatible with other (non-POL) devices that may also be coupled to the I²C bus. In addition, while the originator of a transaction may be identified through including an identifier data byte in the transaction, such inclusion may come at the cost of additional bus traffic and may therefore lead to higher bandwidth requirements. Furthermore, the inclusion of an identifier byte in the packet may not address the issue of addressing a selected group of POL regulators.

Figure 8:
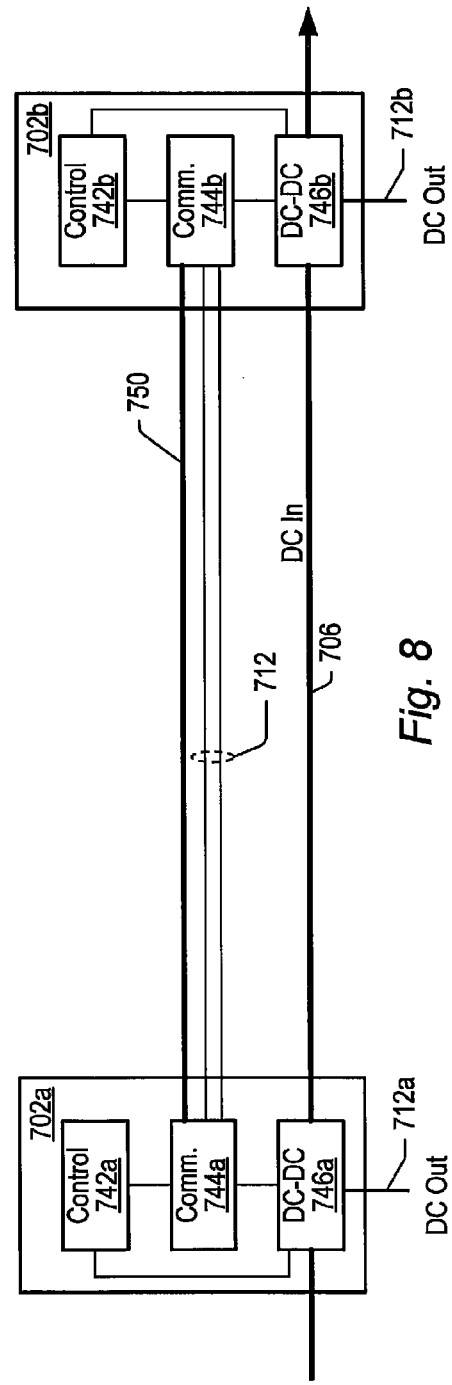
FIG. 8 illustrates the interface terminals of a Local Controller configured according to one embodiment.

FIG. 8 shows one embodiment of two multi-function POL regulators 702a and 702b coupled together via serial bus 750, and/or I²C bus 712. As also shown in FIG. 8, POL regulator 702a may include control logic 742a, communication logic 744a and a DC-DC converter 746a. Similarly, POL regulator 702b may include control logic 742b, communication logic 744b and a DC-DC converter 746b. A common power distribution bus 706 may carry the DC input voltage to the DC-DC converters 746a and 746b. It should be noted, that in alternate embodiments, POL regulators 702a and 702b may each include an AC-DC converter instead or in addition to the DC-DC converters shown, with an appropriate AC power distribution bus providing the AC input voltage to each AC-DC converter. Communication logic 744a and 746a may comprise circuitry implementing the communication protocols that may be used for POL regulators 702a and 702b communicating with each other via serial bus 750 and/or I²C bus 712. Control logic 742a and 742b may comprise circuitry implementing control functions and power management functions that may be performed by POL regulators 702a and 702b, including controlling respective DC output voltages 721a and 712b. As FIG. 10 illustrates, multiple multi-function POL regulators similar to POL regulators 702a and 702b may be coupled together via the I²C bus, and/or serial data bus 750. Though not illustrated in FIG. 10, other, non-POL devices may also be coupled to bus 750.

Thus, various embodiments of a power management system may be configured with POL regulators (such as the multi-function POL regulator shown in FIG. 7) coupled together as shown in FIGS. 8 and 10, for example. Referring to FIG. 7, each POL regulator may be configured using program pins 716 to set various parameters, control values, and/or default values relating to the controlled voltage output of the POL regulator, as well as power management functions that may be performed by the POL regulator. Then, each POL regulator may simply be coupled to a bus (e.g. I²C bus or a serial bus) with other POL regulators, with the POL regulators functioning together as network of devices upon system power-up, without requiring any further adjustments. In one sense, each POL regulator may be configured as a "plug & play" device, in that once it is plugged into the network of POL regulators, it may begin functioning as part of the power management system. As configured via pin-strapping, each POL regulator may be enabled to monitor information and packets that have been transmitted onto the bus (be it bus 750 and/or the I²C bus, or any selected bus configured to couple the POL regulators together), and perform various tasks and power management functions according to the pin-strapping configuration and the monitored information. Each POL regulator may therefore initiate communication with other similar POL regulator coupled to the bus, and/or may respond to communication initiated by other similar POL regulators, thereby performing a variety of power management functions that may include supply sequencing, phase staggering, current sharing, margining, self testing, status monitoring, etc.

Figure 9:
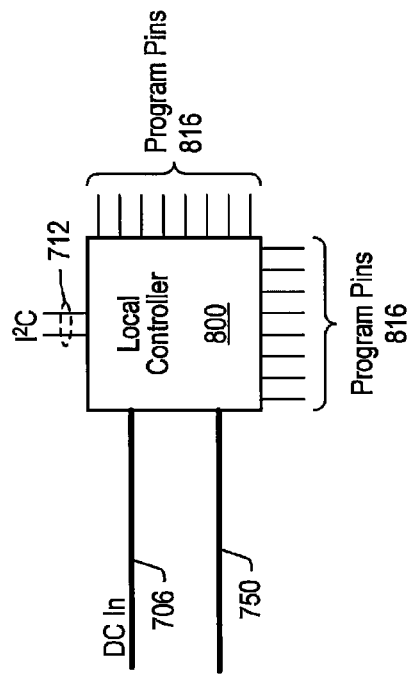
FIG. 9 illustrates one embodiment of multi-function POL regulators coupled together.

In one set of embodiments, in addition to the POL regulators, a local controller, such as the one shown in FIG. 9, may also be coupled to the bus. The local controller may be used to manage some of the system tasks that are common to all POL regulators, minimizing die area for a given system due to a reduction in redundancy. In other words, select power management functions required to be configured in all POL regulators present in a given system may be offloaded to the local controller, thereby obviating the need to incorporate partial or full functionality of the select power management function in each POL regulator individually. This may reduce the die area required for each POL regulator, and therefore the entire given system. In addition to communicating with and/or controlling the POL regulators, the local controller may also receive inputs from other non-POL digital chips within the system, and may also provide data to other system chips. Thus, power control, configuration, and monitoring may be made available to the entire system and any network to which the system may be connected, for example the World Wide Web (WWW). While the POL regulators coupled via a bus (e.g. bus 750 or the I²C bus) may form an independent, autonomously operating ad-hoc power management network, coupling a local controller to this power management network may also enable the power management network to communicate with other parts of a larger system, including the components for which the POL regulators are providing the power.

As mentioned above, one embodiment of a local controller is shown in FIG. 9. Local controller 800 may interface to I²C bus 710, and may couple to a serial digital bus 750. Local controller 800 may be programmed or configured via pin strapping (using program pins 816) or through I²C bus 710, and may replace microcontrollers used in many prior art systems. It may control POL regulators in the system over bus 750 or via an embedded I²C controller. Local controller 800 may also perform dedicated routines by issuing common commands to the coupled POL regulators. A truth table may be devised to allow a user to configure common functions without having to write software routines. Local controller 800 may also be configured during manufacturing by connecting a computer to I²C bus port 710 and using custom software to set up the system. In one set of embodiments, a controller configured in local controller 800 may contain state machines capable of performing common functions like programming POL regulators, reading system status, and setting up system level functionality (such as supply sequencing and phase control), if necessary. As the controller may be designed to work with the POL regulators, most features may be automatically enabled (or suppressed) by simple pin-strap choices. Local controller 800 may also include system supervisory functions not associated with a particular POL regulator. A number of local controllers may also be linked together in a master-slave or multi-master configuration such that a complex hierarchy may be established.

In one embodiment, the POL regulators may communicate with each other using a multi-master/multi-slave bus architecture, which may be configured to have information identified as having originated from a particular POL regulator, and to have the information distributed to multiple destinations by allowing the originating POL regulator to effectively transmit the information to itself. For example, a given POL regulator having address 0x01 may transmit data corresponding to its measured output voltage to other POL regulators on the bus by performing a bus write, where the target address for the bus write is the given POL regulator's own address. For a possible structure of the POL regulator(s) shown in FIG. 8—considering for example POL regulator 740a—a register or registers may be configured as part of either control logic 742a or communication logic 744a, to store the POL regulator's address. The action of performing a bus write in which a given POL regulator may be sending the packet to its own address may operate to identify the source of the data (e.g. address 0x01), and at the same time allow any slave device (e.g. POL regulators configured to voltage track device 0x01) that needs the data to identify and receive the needed data from the bus during the transaction.

In one set of embodiments, bus arbitration implemented for a shared bus coupling the POL regulators may include a device acknowledging its own address for any bus transmission that contains that address. A POL regulator acting as bus master may perform this acknowledgement when transmitting a packet using its own address as the target address in case it is coincidentally also the target of a communication by an external controller which may also be coupled to the shared bus. The data may match through the address byte, with the external controller seeing the acknowledgment as expected. Arbitration may continue through the byte following the address within the transmission packet. The data byte following the address may be command byte, which may indicate that the transmission contains information for power management, in which case the external controller may recognize a loss of arbitration. Alternatively, if the byte following the address does not indicate that the transmission contains information for power management, the external controller may win arbitration. In one set of embodiments, each transmission initiated by a POL regulator may follow transmission of its own address by an 'Event' command reserved for use by POL regulators sending event information. An external controller that may also be addressing one of the POL regulators would not use the 'Event' command, thereby allowing for effective bus arbitration.

When no two devices are allowed to share a bus address, it may be safe for a given device to initiate bus operations using the given device's address as the target address for the bus operations (e.g. the given device performing a write to its own address) without requiring any other configuration. For example, a POL regulator may be aware that its own address is unique, and that only other POL regulators may be configured to monitor that address as part of a group of addresses used for event communication between POL regulators, making this method of transferring information between POL regulators compatible with non-power (or non-POL) devices. Again, no special configuration may be necessary, as each device, including all those not associated with power delivery (i.e. devices other than POL regulators coupled to the shared bus) may be configured to respond to its own slave address. A transmitting POL regulator's slave address being unique and not shared by any other device is sufficient to cause other devices (at different addresses) to ignore packets addressed to the POL regulator.

Furthermore, in addition to having its own respective assigned unique bus address, each POL regulator may be assigned or configured with one or more other unique addresses, grouping the POL regulators into address groups. The additional unique addresses may define one or more POL regulator groups, enabling specialized group data exchange that may be required by various power management features. The additional address, addresses, or address groups may be used to receive data transmitted onto the bus by a POL regulator acting as bus master, and for other POL regulators to recognize the identity of the master POL regulator. Such configuration or configurations are compatible with normal features of already existing buses (and corresponding bus protocols) such as the $I^2C$ and System Management Bus (SMBus) for example, both of which allow for bus arbitration and clock stretching that may be required by master and slave devices. Packets sent to a POL regulator by a local controller may be differentiated from packets transmitted by a master POL regulator by the value of the command or tag following the address within any given packet. Alternatively, each POL regulator may be configured with an additional assigned address or addresses that are uniquely different from a respective address used by the local controller to address a given POL regulator. The additional addresses may be used exclusively for implementing a select set of features (for example, power management features) in which case the use of these additional addresses may uniquely distinguish the group communication packets corresponding to that set of features from conventional bus traffic originated by the local controller.

It should be noted that identifying a given POL regulator as a master POL regulator does not imply control of other POL regulators by the given (master) POL regulator. Instead, it is indicative of the given POL regulator's current designation as a bus master by virtue of its originating a transmission. Similarly, the term "slave POL regulator" may simply refer to POL regulators that are currently monitoring the bus for transactions and are not currently transmitting information, but are not in effect controlled by a transmitting master POL regulator. In other words, a master POL regulator may be acting as the bus master to initiate/make a transmission, and remain a peer to other POL regulators while making information available to a group of designated POL regulators. The master POL regulator may not actually behave as a master with respect to the other (slave) POL regulators insofar as it may not actively control the other (slave) POL regulators. In actuality, those skilled in the art may note that in the terminology of certain buses, for example the SMBus, a transmitting device—such as the given POL regulator designated as a master POL regulator above—may simply be regarded as a slave device addressed by its own transmission.

In one embodiment, each POL regulator required to transfer information to other POL regulators first becomes the bus master and transmits its own address, followed by a transaction tag that identifies the type of transaction. FIG. 10 illustrates an example of a POL regulator to POL regulator transfer, where POL regulator 104 transmits a packet to POL regulators 102 and 106. The packet transmitted by POL regulator 104 may be accessible by all other devices coupled to bus 120, including non-POL devices 110, 112, and 114. However, POL regulators 102 and 106 may be the only devices configured to recognize the packet and accept the data from POL regulator 104. In addition to their own respective addresses, POL regulators 102 and 106 may also be configured to recognize the respective address of POL regulator 104, enabling them to respond to any packet addressed to POL regulator 104. Thus, when POL regulator 104 transmits a packet to itself, POL regulators 102 and 106 may also recognize that packet.

In one embodiment, POL regulators may be configured with an $I^2C$, SMBus, or other shared bus interface (for example bus 750 in FIG. 10) in a novel POL regulator design. Each POL regulator may include at least two slave address registers. The slave address registers may support concurrent comparisons with an address contained in a packet transmitted onto the bus. If the address in the packet results in a match for either of the slave address register values, the POL regulator may recognize the address and may respond to the packet, receiving data written by the master POL regulator if the packet indicates a write operation writing data to the slave POL regulator that recognizes the address, and providing data to the master POL regulator if the packet indicates a read operation reading data from the slave POL regulator that recognizes the address.

Figure 13:
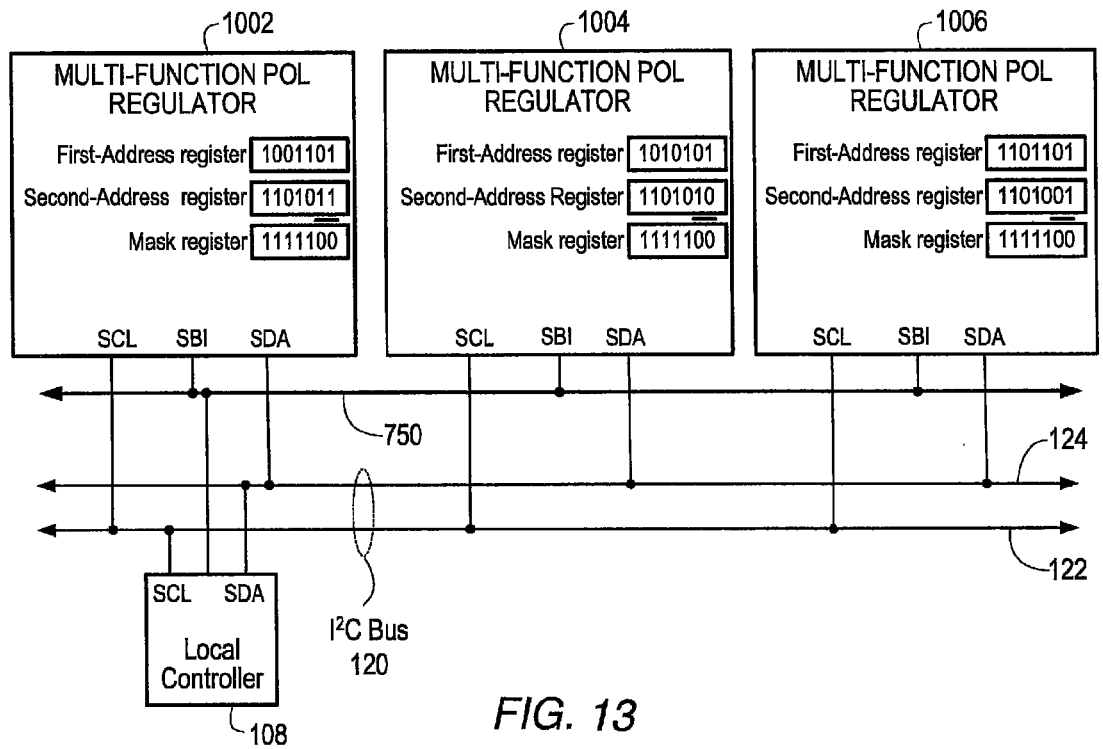
FIG. 13 shows one embodiment of a system configured with POL regulators coupled to an I²C bus, where each POL regulator is configured with multiple address registers.

FIG. 13 shows one embodiment of a group of slave address and mask registers that may be configured in POL regulators 1002, 1004, and 1006. The First-Address register may be programmed with a slave address uniquely identifying the POL regulator in which the First-Address register has been configured. For example, the First-Address register in POL regulator 1002 may be programmed with an address ('1001101' in FIG. 13) that uniquely identifies POL regulator 1002. POL regulators 1004 and 1006 may similarly be identified by the unique addresses programmed in their respective First-Address registers. The unique respective slave address thus assigned to each respective POL regulator may be used by local controller 108, which may also be coupled to I²C bus lines SDA 124 and SCL 122, (as well as to bus 750, to which the POL regulators may also be coupled via a serial bus interface (SBI) connection) when addressing any one or more of POL regulators 1002, 1004, and 1006 for status and/or control purposes. It should be noted that while only three POL regulators are shown for illustrative purposes in FIG. 13, more or fewer POL regulators may be coupled to I²C bus 120 and/or to bus 750 as required. Also, another shared bus other than (or in addition to) I²C may be used, for example an SMBus.

Referring again to FIG. 13, the Second-Address register may be programmed with a second unique respective slave address for POL regulators 1002, 1004, and 1006. In one set of embodiments, a respective Mask register may be associated with each Second-Address register. The bits in the Mask register may modify the address recognition function performed with the Second-Address register. For example, bits in the Mask register that are set to logic '1' may identify corresponding bits in the Second-Address register that must match the corresponding bits in the packet address for the address programmed into the Second-Address register to be recognized as a matching address. Bits in the Mask register that are set to logic '0' may identify corresponding bits in the packet address that do not have to match corresponding bits in the Second-Address register for the packet address to be recognized as a match for the address programmed into the Second-Address register. The '0' bits in the mask register may therefore correspond to a set of bits that identify devices within a group of addresses, and all addresses in that group may constitute a match for an address programmed into the Second-Address register.

For example, if the seven address bits in the Second-Address register are '1101011', as shown for POL regulator 1002 in FIG. 13, and the seven bits of the Mask register are '1111100', as also shown for POL regulator 1002, a group of four addresses may be defined. These four addresses may be '1101000', '1101001', '1101010' and '1101011'. The two LSBs may identify the given POL regulator (that includes the given Second-Address register) within the address group identified by the five MSBs of the address bits in the Second-Address register. Thus, the two LSBs may have any value as long as the five MSBs match, to result in the POL regulator responding to a given address received in a data packet. The four addresses in the example above may be assigned to individual POL regulators 1002, 1004, and 1006, as exemplified by '1101010' being programmed into the Second-Address register of POL regulator 1004, and '1101001' being programmed into the Second-Address register of POL regulator 1006. Each of POL regulators 1002, 1004, and 1006 in the group may use the address programmed into their respective Second-Address registers when sending a broadcast packet to the group, where every other POL regulator in the group may consequently recognize the address as matching the masked programmed address in its respective Second-Address register, and accept the packet as a group transmission. In addition, the full, unmasked address contained within the packet may uniquely identify which member of the group was the originating device.

It should be noted that the number of bits within an address register and the number of address registers within each POL regulator were selected for illustrative purposes, and alternative embodiments may be configured with buses featuring packet sizes other than one byte, and may include more or less than two address registers and one mask register, where an address register and/or mask register may be configured with more or less than seven bits. Furthermore, address groups may be defined by specified address ranges, in which case mask registers may not be required for configuring each POL regulator's address recognition function. Referring back to POL regulator 702a in FIG. 8, for example, control logic 742a or communication logic 744a may be configured to perform the address recognition based on a specified address range. That is, either logic block may be configured to recognize any of the four addresses '1101000', '1101001', '1101010' and '1101011'— to use the example provided above—as being part of the same address group, and thus have an address match, should the address received in the packet transmission be any one of those four addresses.

Example packet tags may include, but may not be limited to, a "power good" event tag, a "power fail" event tag, a measured output voltage tag, a measured load current tag, a fault event tag, or various configuration information tags. For transactions that include data, the tag may be followed by the actual digital data. As previously mentioned, each POL regulator may be configured through pin-strapping, coupled to a selected bus, where it may being monitoring the bus for data packets, and respond to the packets at least according to the address recognition function also described above. Such "plug & play" capability may allow for implementing power sequencing functionality, for example, by configuring any given POL regulator to enable its output subsequent to a transmitting (or master) POL regulator having issued its own respective "power good" event, as illustrated in FIG. 17a. The packets shown in FIG. 17a may represent a POL regulator, for example POL regulator 1002 from FIG. 13, transmitting a "power good" event tag to the bus, such as I²C bus 120 or bus 750 in FIG. 13. As part of first data byte 1420, POL regulator 1002 may transmit its own unique address, identifying itself as the originating device, acknowledging its own address in bit 1408, with the "power good" tag following in data byte 1422. Other POL regulators that have been previously configured, for example POL regulators 1004 and 1006 (also of FIG. 13) may detect the "power good" event on the bus, and may respond accordingly. Similarly, the other configured POL regulators 1004 and 1006 may each issue their own respective "power good" transaction on the bus when appropriate.

As previously mentioned, for efficient bus arbitration taking into account non-POL devices also coupled to a bus shared by POL regulators, e.g. local controller 108 in FIG. 13, an 'Event' command may be transmitted prior to the "power good" tag transmitted in data byte 1422. FIG. 17b illustrates another embodiment of a packet structure that may be used when implementing sequencing functionality. In this embodiment, the packet structure may be designed to be compatible with an already existing bus protocol, for example with PMBus (Power Management Bus) specification/functionality. For example, a given bus protocol (such as the PMBus protocol) may be configured to have an initial address within a transmission packet be followed by a "command" byte/code identifying the type of the bus packet. Packet types may reference operational values or may cause changes in the active state of the addressed device. According to the embodiment of FIG. 17*b*, a specific command code labeled "event" may be reserved within a previously defined command set that corresponds to the selected (used) bus protocol, to designate a power management type packet. The "event" command may thus be used to designate packets transmitted to facilitate power management functions. The packet structure shown in FIG. 17*a* may then be modified to the packet structure show in FIG. 17*b*, with the transmitting POL regulator first indicating that the packet is a power management type packet by transmitting "event" command 1423 before transmitting its "power good" event 1422. As also shown, in this embodiment only the address may need to be acknowledged (acknowledge bit 1408) during transmission, while the command and event type following the command may not be required or expected to be acknowledged. A "power down" event may similarly be implemented, with the "power good" event type being replaced in each case with a "power down" event type. By thereby filtering "power good" and "power down" events using defined prequel and sequel addresses, the acceptance of those events may be limited to only those relevant to each POL regulator's sequencing configuration.

Another power management function that may be similarly implemented is voltage tracking. For voltage tracking, the POL regulators may be configured to track a selected POL regulator by monitoring the bus for the selected POL regulator's transactions, as determined by the selected POL regulator's address and tag. The monitoring POL regulators may control their own outputs according to the data values retrieved from the transactions received from the selected POL regulator. In various embodiments, the selected POL regulator may vary, and may be any one of the POL regulators, according to the initial configuration of the POL regulators, which may be through pin-strapping, or by a local controller programming the POL regulators via the coupling bus, if so desired. Current sharing and other power management features may also be implemented in similar fashion. In addition, a given POL regulator's configuration information may similarly be transmitted to other POL regulators. For example, each POL regulator may transmit its programmed target voltage to the other POL regulators, allowing the other POL regulators to determine if their own respective target voltage is larger or smaller than the transmitted voltage value. The other POL regulators may thereby automatically configure themselves to sequence or track according to a prescribed order, such as a "largest output first" order. For example, upon having generated 5V, 3V and 2V outputs, the 5V POL regulator may detect based on transmitted configuration information that it should enable first, followed by the 3V POL regulator, then the 2V POL regulator. A group of POL regulators may therefore be configured to automatically sequence according to their respective target voltage levels.

Figure 11:
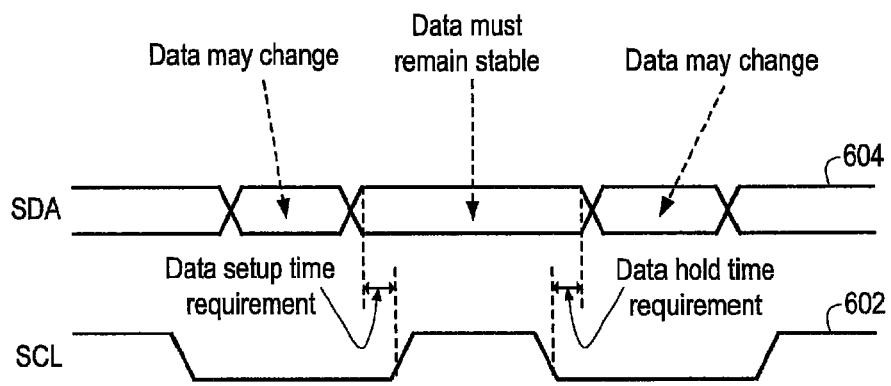
FIG. 11 shows a timing diagram illustrating data setup and hold time requirements for regular data transfer over I²C bus.

Other power management features including, but not limited to, phase spreading, fault recovery, clock synchronization, and over-temperature shutdown may also be implemented in a similar manner. Phase locking—when a group of POL regulators are configured to lock with switching clocks in phase—may also be accomplished in a similar manner by transmitting data or edges on the standard bus. In one set of embodiments, high bit-rate data may be transmitted via a low bit-rate standard synchronous bus while maintaining compatibility with existing bus devices. Synchronous bus architectures typically distribute a clock signal and one or more data signals. Each pulse on the clock signal may trigger the transfer of one bit of information on the data signals. In the case of the I$^2$C bus, the data signal SDA 604 may transition to the next bit value to be transmitted after each falling edge of the clock signal SCL 602, as shown by an exemplary timing diagram in FIG. 11. According to the I$^2$C bus standard, data transitions on SDA line 604 may occur only while SCL signal 602 resides in a low state, and the data must remain stable while SCL 602 resides in a high state, as also illustrated in FIG. 11. SDA 604 transitions that occur while SCL 602 resides in a high state may be used to define the "start" condition and "stop" condition for the bus protocol. According to the I$^2$C bus standard, the "start" and "stop" conditions may be generated by the bus master, and are used to start and end transmission of a packet on the bus.

Figure 12:
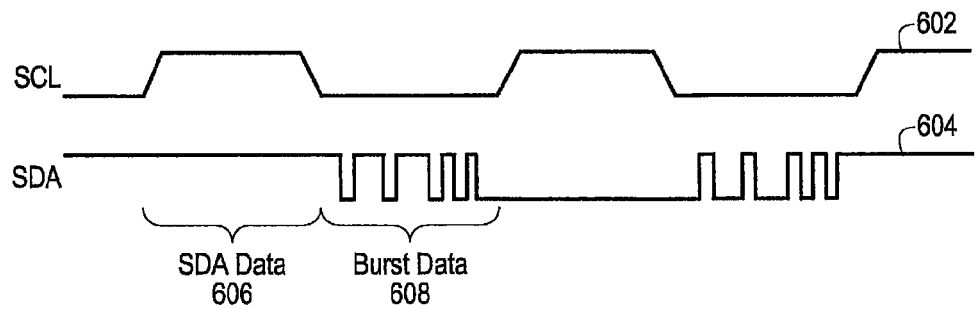
FIG. 12 shows a data burst transfer on the SDA signal bus according to one embodiment.

Standard devices on a bus like the I$^2$C bus are generally configured to ignore transitions on SDA line 604 while SCL signal line 602 resides in a low state. The clock rate typically used in such systems may be relatively low. Furthermore, the I$^2$C specifications and related SMBus specifications include clock stretching capability, that is, where both master and slave devices may be able to extend the time period during which SCL signal 602 resides in a low state. Therefore, data traffic may be embedded on SDA line 604 even while SCL signal 602 resides in a low state. In one embodiment, additional data is transmitted in bursts on the data line (SDA) while the bus clock (SCL) resides in its low state. As illustrated in FIG. 12, SDA data 606 may be stable while SCL signal 602 resides in a high state, as required by the I$^2$C bus specification, for example. The data transitions of burst data 608 on SDA signal line 604 may be ignored by other devices, as data burst 608 occurs while SLC signal line 602 resides in a low state. In other words, a POL regulator may transmit a burst of data on SDA signal line 604, following a falling edge on SCL signal line 602. The POL regulator may be configured to guarantee that the burst has been completed by the next rising edge on SCL signal line 602 by employing the clock stretching capability of the bus, thereby meeting the setup and hold times requirements set forth in the bus specification (and also illustrated in FIG. 11). Legacy devices, that is, devices not configured to operate according to the device-to-device broadcast technique used by the POL regulators as described above, and therefore not able to recognize the data bursts, would operate normally. However, a POL regulator designed to receive and interpret the data bursts may use standard clock recovery techniques to decode and use the burst data.

In one set of embodiments, the bus addresses assigned to the POL regulators (for example as shown in FIG. 13) may be used as part of the operational configuration of the POL regulators. For example, the numerical order of the respective slave addresses programmed into each respective Second-Address register of a group of POL regulators—shown in FIG. 13, for example—may also be used to establish the sequencing order of the POL regulators that are part of the group. In other words, the numerical order of the assigned addresses may correspond to the order in which the POL devices are either enabled or disabled. Also, the respective slave address of a POL regulator may be selected to establish the phase offset of the POL regulator during a switching cycle. When configuring a POL regulator, the address of the POL regulator may be selected such that the POL regulator is enabled to recognize its own place within a switching cycle by examining the address that it has been assigned. For example, by examining its assigned address, a POL regulator may determine that it is the third in a sequence of four POL regulators. In general, any number of features of a POL regulator may be configured through bus address assignments.

Figure 14:
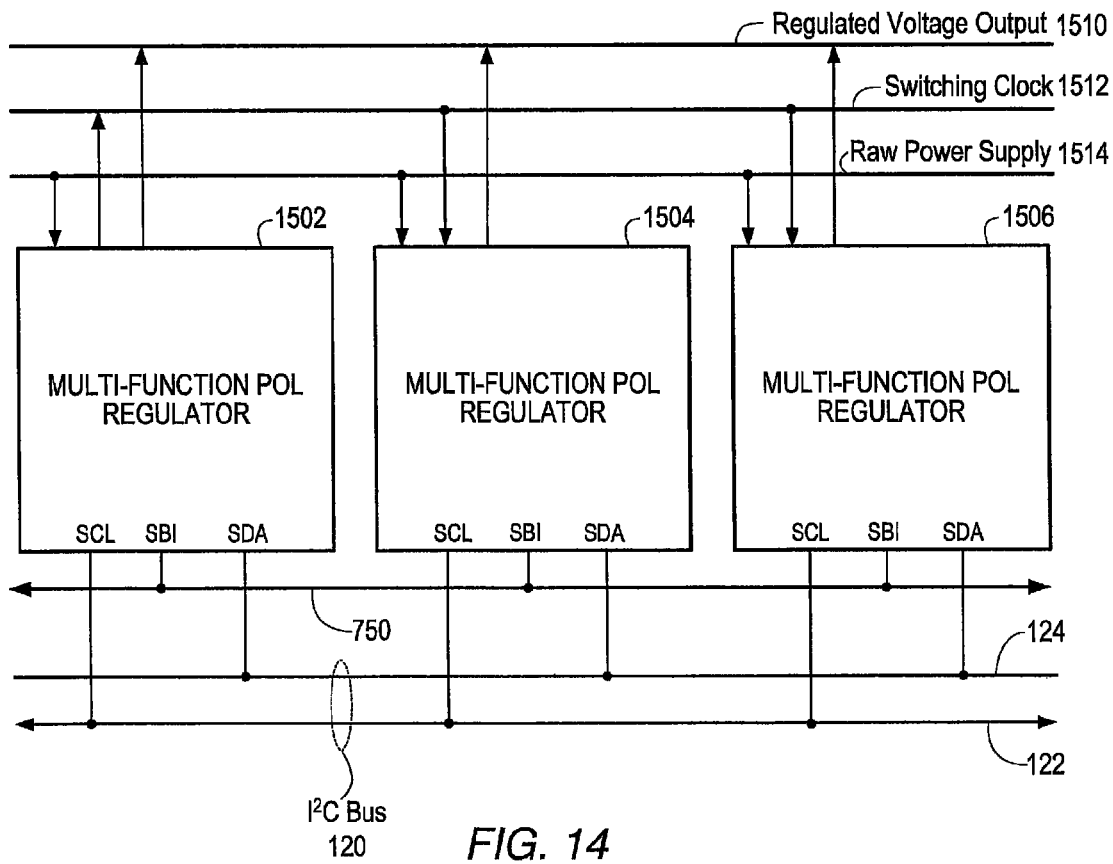
FIG. 14 shows one embodiment of a system configured with POL regulators coupled to an I²C bus, with the POL regulators driving a common load.
Figure 15:
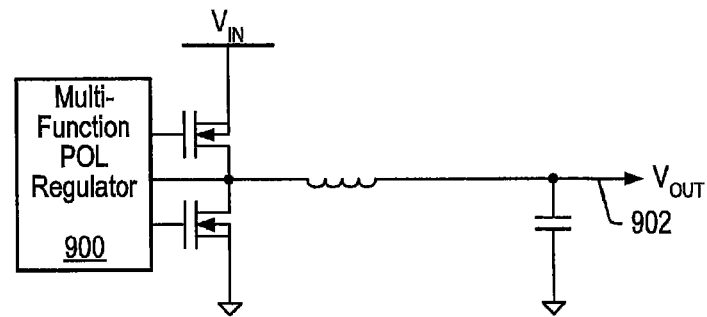
FIG. 15 illustrates a single-phase supply configured with a single multi-function POL regulator according to one embodiment.
Figure 16:
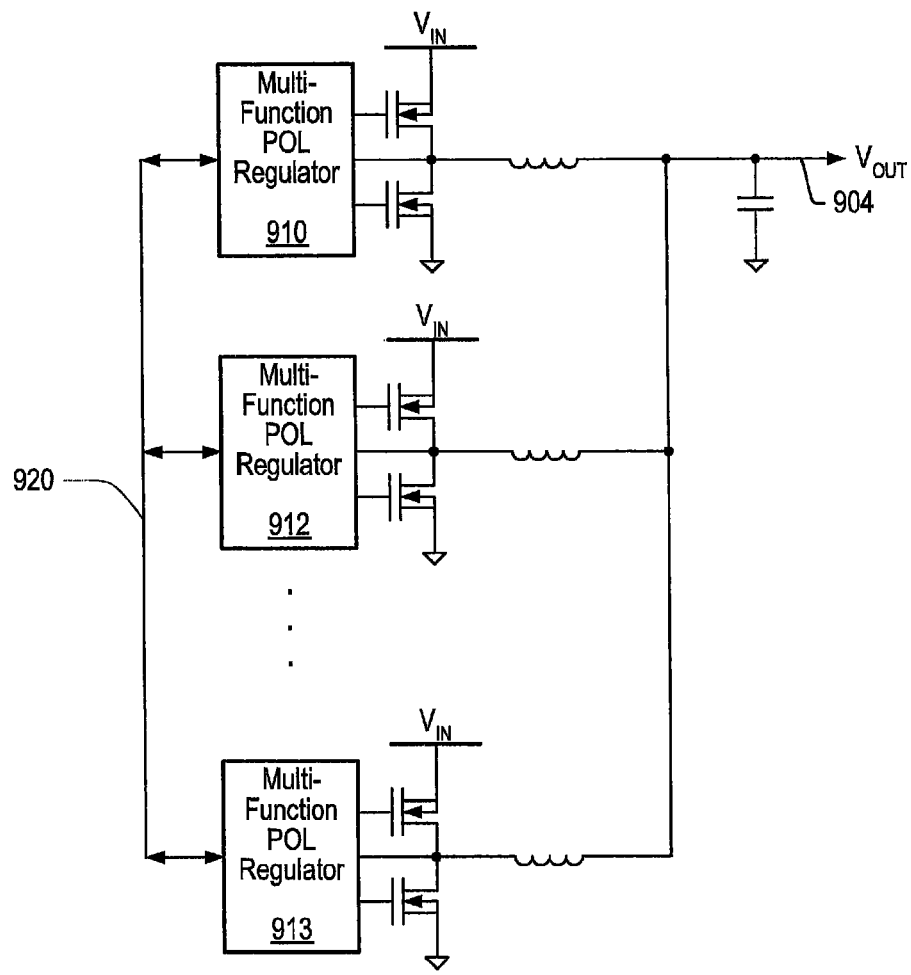
FIG. 16 illustrates a multi-phase supply configured with multiple multi-function POL regulators according to one embodiment.

In one embodiment, a common switch clock is used by a group of POL regulators that are driving a common load, as illustrated in FIG. 14. POL regulator 1502, by virtue of its address, may recognize itself to be the lead device and output its switching clock, which is wired to all the other devices in the group via switching clock line 1512. As shown, POL regulators 1504 and 1506 may receive the switching clock signal output by POL regulator 1502. In order to minimize and/or eliminate conflict among multiple POL regulators trying to drive common switching clock connection 1512, POL regulators 1502, 1504, and 1506 may be configured such that only POL regulator 1502 may recognize itself to be the lead device. This may accomplished as part of the initial configuration of each POL regulator, either via pin-strapping for "plug & play" capability, or by a local controller for configuring following system power-up. As a result, each POL regulator may be placed in phase with respect to the common load that the POL regulators may be controlling via common regulated voltage output line 1510. Each POL regulator may receive the raw power input from power supply 1514. Each POL regulator may therefore only require information about the size of the group and its own position within the group for the POL regulators to be spread out in phase within the switching cycle. For example, lead POL regulator 1502 may set its phase adjustment to 0, and POL regulators 1504 and 1506 may set their phase adjustment to 120 degrees and 240 degrees, respectively.

In one set of embodiments, POL regulators or groups of POL regulators that are driving different loads may have independent clocks per each load device. In such embodiments, each POL regulator may generate its own clock locally, from an internal oscillator. Accordingly, a mismatch between respective oscillators configured in different POL regulators may be addressed by calibrating the oscillators against each other, in-system. Referring again to FIG. 13, by way of example, POL regulator 1002 may be identified as the voltage-tracking master device, and may send a command on bus 120 instructing all POL regulators, in this case POL regulators 1002, 1004 and 1006, to measure the length of a subsequent transaction on the bus. The packet structure for this command, according to one embodiment, is shown in FIG. 18. In this embodiment, POL regulator 1002 initiates clock synchronization by transmitting its own address in first byte 1224 and subsequent synchronization command in second byte 1226. The synchronization command may call for all POL regulators in the group to measure the duration between "start" 1210 and "stop" 1222 using their own respective oscillators. POL regulator 1002 may transmit Data bytes 1230, 1232, and 1234 for the purpose of extending the time between "start" 1210 and "stop" 1222 to achieve the desired timing accuracy. In other embodiments, the number of data bytes transmitted by POL regulator 1002 may be less or more than three.

Following completion of the measurements, the master device, in this case POL regulator 1002, may send its own measured count to which the slave devices may compare their own respective counts, and determine the relative error between the master device's oscillator and their own respective oscillator. The packet structure for this command, according to one embodiment, is shown in FIG. 19. In this embodiment, POL regulator 1002 initiates a packet again by transmitting its own address in first byte 1316. In subsequent second byte 1318, POL regulator 1002 may transmit a timing result command indicating to the other POL regulators that POL regulator 1002 is about to transmit its timing results from the preceding clock synchronization event. Timing count bytes 1320 and 1322 may represent the timing results, which the other POL regulators, in this case POL regulators 1004 and 1006, may use to calculate corrections to their respective clocks, thereby insuring that there is no timing error between the oscillator of POL regulator 1002 and the respective oscillators of POL regulators 1004 and 1006. Any potential errors may be corrected by each slave POL regulator (again, in this case POL regulators 1004 and 1006) electrically trimming its oscillator frequency, or by mathematically (digitally) correcting the difference, and subsequently generating the proper corresponding frequency.

In one set of embodiments, some or all of the POL regulators in a POL group may write required data to the bus within a single packet that is initiated by one of the POL regulators. Each POL regulator may have one or more assigned data elements within the single packet or packet type as determined by the tag written by the initiating master POL regulator. In one embodiment, the assigned addresses of the POL regulators determine the order of transmission within the single packet. As shown in FIG. 20, and referencing FIG. 13, POL regulator 1002, acting as a master POL regulator, may begin transmission of the single packet by transmitting its address in first byte 1126, indicated as a "write" operation by bit 1104, followed by a "group exchange command" packet tag in second byte 1128. Once the command has been acknowledged (1108), POL regulator 1002 may retransmit its address in byte 1130, this time indicated as a "read" operation by bit 1112. POL regulator 1002 may thereby request members of the group of POL regulators to transmit data onto the bus. Each POL regulator, as determined by its respective address, may in response write its own portion of the data to the bus at the appropriate time as the packet progresses, as illustrated by data bytes 1132, 1134, and 1136, representing data bytes placed on bus 120 by POL regulators 1002, 1004, and 1006, respectively. A single "start" bit 1110 and "stop" bit 1124 framing data bytes 1132, 1134, and 1136 is indicative of a single packet.

In one set of embodiments, when configuring POL regulators to communicate with each other using a pre-existing bus such as an I$^2$C bus or SMBus as described above, only a subset of the pins normally required for a standard implementation of the pre-existing bus may be needed. In other words, proprietary bus functionality embedded in the standard bus protocol of the utilized bus (to provide the required communication capabilities for power management functions) may be accomplished with fewer pins than what a standard bus interface for the utilized bus may require. For example, in case of applications that require an I$^2$C interface only for implementing communications between POL regulators, a single pin, rather than two I$^2$C pins, may be sufficient. Thus, a single-wire bus may be used to implement the necessary communication capabilities for power management functions on that pin. In addition, as previously mentioned, POL regulators may have multiple bus interfaces, as shown for example in FIG. 8, where communication blocks 744*a* and 744*b* are adapted to couple each POL regulator to both an I$^2$C 712 bus and bus 750. Accordingly, POL regulators having multiple bus interfaces may be adapted to transmit/receive information/data to/from one bus and transmit/receive information/data to/from another bus.

It should also be noted that while the above examples presented a bus write as a means for transmitting information from one POL regulator to another, a bus read may be used in a similar manner to transfer the information. That is, the originating POL regulator may effectively read from itself. However, slave POL regulators in its group may need to be configured to recognize the master POL regulator's address without responding to the packet in the same manner in which they would respond to a conventional bus read from the local controller. In other words, the POL regulators may be required to not supply data in response to the read bit. This mode of operation may involve additional non-standard device behavior, and may introduce additional overhead in the packet by adding a repeated start signal and address to accomplish setting the read bit. It should also be noted that the "event" command used for insuring compatibility with already existing bus protocols may be included for all power management related transmissions by the POL regulators. Therefore, the packet structures illustrated in FIGS. 18-20 may all be modified to include an "event" command byte following the acknowledgement bit for the transmitting POL regulator's address and preceding the byte containing the power management function command, similar to the packet structure shown in FIG. 17b.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for performing distributed power management, the method comprising:
  programming each POL regulator of a plurality of POL regulators belonging to a first address group by coupling at least a subset of a plurality of pins of each POL regulator to predefined voltage levels, each POL regulator thereby having a respective pinstrapping configuration and operating in a prescribed manner defined at least in part by the respective pinstrapping configuration, wherein the pinstrapping configuration of each POL regulator defines:
    an address assigned to the POL regulator, and stored in an address register comprised in the POL regulator, wherein the assigned address uniquely identifies the POL regulator, and wherein a first portion of the first address identifies the first address group; and
    a mask assigned to the POL regulator, and stored in a mask register comprised in the POL regulator, wherein the mask is configured to mask out all but the first portion of the first address in the address register, leaving the first portion of the first address unmasked to identify the POL regulator as a member of the first address group;
  coupling the plurality of POL regulators to a bus;
  at least a first one of the plurality of POL regulators becoming a bus master according to its pinstrapping configuration, and initiating a first bus operation over the bus by transmitting its assigned address onto the bus; and
  each POL regulator monitoring the bus and responding to the first bus operation according to its pinstrapping configuration, comprising at least a second one of the plurality of POL regulators identifying the first portion of the assigned address of the first one of the plurality of POL regulators, and performing at least one function according to its pinstrapping configuration in response to said identifying the first portion of the assigned address of the first one of the plurality of POL regulators.

2. The method of claim 1;
  wherein the first bus operation comprises the first one of the plurality of POL regulators transmitting data onto the shared bus; and
  wherein the method further comprises the second one of the plurality of POL regulators receiving the data.

3. The method of claim 2, wherein said transmitting data onto the bus is performed during time periods when, according to a bus protocol corresponding to the bus, data transmitted onto the bus is not required to remain stable.

4. The method of claim 2, further comprising the second one of the plurality of POL regulators performing one or more power management functions according to its pinstrapping configuration and the data.

5. A power management system configured to facilitate communication between POL regulators belonging to a first address group, using a standard multi-master multi-slave bus interface, the system comprising:
  a shared bus; and
  a plurality of POL regulators coupled to the shared bus, wherein each of the plurality of POL regulators is programmed to have its own pinstrapping configuration by coupling at least a subset of a plurality of pins of the POL regulator to predefined voltage levels, the POL regulator operating in a prescribed manner as defined at least in part by the pinstrapping configuration, and wherein each of the plurality of POL regulators is configured to transmit and receive information over the shared bus, wherein each POL regulator of the plurality of POL regulators; comprises:
    one or more address registers, wherein each address register of the one or more address registers is configured to store a different address that uniquely identifies the POL regulator, wherein a first portion of the address stored in at least one address register of the one or more address registers identifies the first address group; and
    a mask register corresponding to the at least one address register and configured to mask out all but the first portion of the first address in the at least one address register, leaving the first portion of the first address in the at least one address register unmasked to identify the POL regulator as a member of the first address group;
  wherein each of the plurality of POL regulators is configured to:
    selectively operate as a bus master POL regulator according to its pinstrapping configuration, and initiate a first bus operation as the master POL regulator by transmitting onto the shared bus a first address, wherein the first address is the address stored in the at least one address register of the one or more address registers comprised in the master POL regulator;
    selectively operate as a bus slave POL regulator when not operating as the master POL regulator;
    monitor the shared bus and identify the first address transmitted onto the bus by the master POL regulator; and
    perform at least one function according to its pinstrapping configuration in response to identifying the first address transmitted onto the bus by the master POL regulator.

6. The power management system of claim 5, wherein each different address that uniquely identifies each given POL regulator of the plurality of POL regulators is assigned to the given POL regulator according to one or more operational configurations of the given one POL regulator.

7. The power management system of claim 5;
wherein the first bus operation comprises the master POL regulator transmitting a specified power management command onto the bus;
wherein each of the plurality of POL regulators is configured to receive the specified power management command; and
wherein one or more of the plurality of POL regulators are configured to perform according to their respective pinstrapping configurations one or more power management functions corresponding to the power management command.

8. A system comprising:
a bus configured to operate according to a bus protocol; and
a plurality of POL regulators coupled to the bus, wherein the plurality of POL regulators belong to a first address group, wherein each of the plurality of POL regulators comprises:
a plurality of pins, wherein each of the plurality of POL regulators is programmable by coupling at least a subset of the plurality of pins to predefined voltage levels, each POL regulator thereby having a pinstrapping configuration and operating in a prescribed manner as defined at least in part by the pinstrapping configuration;
an address register configured to store a first address that uniquely identifies the POL regulator, wherein a first portion of the first address identifies the first address group; and
a mask register configured to mask out all but the first portion of the first address in the address register, leaving the first portion of the first address unmasked to identify the POL regulator as a member of the first address group;
wherein the plurality of POL regulators are configured to transmit and receive information over the bus according to the bus protocol;
wherein at least a first one of the plurality of POL regulators is configured to initiate a first bus operation by transmitting its first address onto the bus; and
wherein each one of the plurality of POL regulators is configured to monitor the bus and respond to the first bus operation according to its pinstrapping configuration, including at least a second one of the plurality of POL regulators performing at least one function according to its pinstrapping configuration in response to identifying the first address transmitted by the at least first one of the POL regulators.

9. The system of claim 8, wherein the first bus operation comprises the first one of the POL regulators transmitting specified information onto the bus, wherein the second one of the plurality of POL regulators is configured to receive the specified information.

10. The system of claim 9, wherein the second one of the plurality of POL regulators is configured to perform one or more power management functions according to its pinstrapping configuration and the specified information.

11. The system of claim 8, wherein in responding to the first bus operation, each POL regulator is configured to perform one or more power management functions according to its pinstrapping configuration.

12. The system of claim 8, wherein the bus is one of:
an Inter-IC ($I^2C$) bus;
a Power Management Bus (PMBus); and
a System Management Bus (SMBus).

13. The system of claim 8, wherein the bus operation is one of:
a bus write operation; and
a bus read operation.

14. The system of claim 8, further comprising a local controller coupled to the bus and configured to individually access and/or control one or more of the plurality of POL regulators through the bus.

15. The system of claim 14, further comprising non-POL devices coupled to the bus, wherein the local controller is configured to access and/or control the non-POL devices through the bus.

16. The system of claim 15, wherein each of the plurality of POL regulators has at least a second address that uniquely identifies the POL regulator;
wherein in individually accessing and/or controlling one or more of the plurality of POL regulators through the bus, the local controller is configured to use the second address of the accessed and/or controlled POL regulator to address the accessed and/or controlled POL regulator.

17. The system of claim 8, wherein as part of the first bus operation, the first one of the plurality of POL regulators is configured to identify its first address after having transmitted its first address onto the bus.

18. The system of claim 17, wherein as part of the first bus operation, the first one of the plurality of POL regulators is configured to transmit a special command onto the bus after having identified its first address, wherein the special command indicates that the first bus operation is intended for one or more of the POL regulators;
wherein each of the plurality of POL regulators is operable to recognize the special command.

* * * * *